(12) United States Patent
Bayer et al.

(10) Patent No.: US 10,626,237 B2
(45) Date of Patent: Apr. 21, 2020

(54) METHOD OF PRINTING A THREE-DIMENSIONAL ARTICLE

(71) Applicant: Dow Global Technologies LLC, Midland, MI (US)

(72) Inventors: Roland Bayer, Walsrode (DE); Aleksander J. Pyzik, Midland, MI (US); Sharon Allen, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 16/356,625

(22) Filed: Mar. 18, 2019

(65) Prior Publication Data

US 2019/0211170 A1 Jul. 11, 2019

Related U.S. Application Data

(62) Division of application No. 15/106,637, filed as application No. PCT/US2015/010746 on Jan. 9, 2015, now Pat. No. 10,259,921.

(60) Provisional application No. 61/928,015, filed on Jan. 16, 2014.

(51) Int. Cl.
| | |
|---|---|
| *C08B 11/02* | (2006.01) |
| *C08B 11/04* | (2006.01) |
| *C08B 11/08* | (2006.01) |
| *C08J 7/04* | (2020.01) |
| *C08B 11/193* | (2006.01) |
| *D01F 2/28* | (2006.01) |
| *B33Y 70/00* | (2020.01) |
| *B29C 64/40* | (2017.01) |
| *B29C 64/118* | (2017.01) |
| *B29C 64/106* | (2017.01) |
| *B29C 64/112* | (2017.01) |
| *B33Y 10/00* | (2015.01) |
| *B33Y 30/00* | (2015.01) |
| *B33Y 80/00* | (2015.01) |
| *B29K 1/00* | (2006.01) |
| *B29K 55/02* | (2006.01) |
| *B29K 67/00* | (2006.01) |
| *B29K 69/00* | (2006.01) |

(52) U.S. Cl.
CPC .............. *C08J 7/042* (2013.01); *B29C 64/106* (2017.08); *B29C 64/112* (2017.08); *B29C 64/118* (2017.08); *B29C 64/40* (2017.08); *B33Y 10/00* (2014.12); *B33Y 30/00* (2014.12); *B33Y 70/00* (2014.12); *B33Y 80/00* (2014.12); *C08B 11/193* (2013.01); *D01F 2/28* (2013.01); *B29K 2001/08* (2013.01); *B29K 2055/02* (2013.01); *B29K 2067/046* (2013.01); *B29K 2069/00* (2013.01); *C08J 2301/28* (2013.01); *C08J 2401/28* (2013.01); *C08J 2455/02* (2013.01); *C08J 2467/04* (2013.01)

(58) Field of Classification Search
CPC ... B29C 64/106; B29C 64/112; B29C 64/118; B29C 64/40; B29K 2001/08; B33Y 10/00; B33Y 40/00; B33Y 70/00; C08B 11/02; C08B 11/04; C08B 11/08; C08J 2301/28; C08J 2401/28
USPC ............................ 264/308, 317; 536/85, 95
See application file for complete search history.

(56) References Cited

U.S. PATENT DOCUMENTS

| | | |
|---|---|---|
| 3,617,588 A | 11/1971 | Langman |
| 4,614,545 A | 9/1986 | Hess |
| 5,121,329 A | 6/1992 | Crump |
| 5,503,785 A | 4/1996 | Crump et al. |
| 6,070,107 A | 5/2000 | Lombardi et al. |
| 6,228,923 B1 | 5/2001 | Lombardi et al. |
| 6,658,314 B1 * | 12/2003 | Gothait ............... B29C 64/40 700/119 |
| 7,081,255 B2 | 7/2006 | Baert et al. |
| 9,962,446 B2 | 5/2018 | Grasman et al. |
| 2002/0136843 A1 * | 9/2002 | Chopra ............... B29C 37/0067 427/487 |
| 2003/0107158 A1 | 6/2003 | Levy |
| 2013/0310507 A1 | 11/2013 | Tummala et al. |
| 2013/0317164 A1 | 11/2013 | Hermes et al. |
| 2015/0065548 A1 | 3/2015 | Adden et al. |
| 2015/0140091 A1 | 5/2015 | Grasman et al. |

FOREIGN PATENT DOCUMENTS

| | | |
|---|---|---|
| EP | 2514775 A1 | 10/2012 |
| WO | WO-99/60508 A1 | 11/1999 |

\* cited by examiner

*Primary Examiner* — Leo B Tentoni

(57) ABSTRACT

A three-dimensionally printed article comprises a build material and a support material, the support material comprising a hydroxypropyl methylcellulose having a DS of at least 1.0 and an MS of at least 0.6, wherein DS is the degree of substitution of methoxyl groups and MS is the molar substitution of hydroxypropoxyl groups. The support material can be removed from the build material by contacting the support material with water.

14 Claims, 3 Drawing Sheets

METHOD OF PRINTING A THREE-DIMENSIONAL ARTICLE

CROSS-REFERENCE TO RELATED APPLICATIONS

This application is a division of U.S. patent application Ser. No. 15/106,637 (now U.S. Pat. No. 10,259,921), filed Jun. 20, 2016, which is a U.S. National Phase Application of International Application No. PCT/US2015/010746, filed Jan. 9, 2015, which claims the benefit of U.S. Provisional Patent Application No. 61/928,015, filed Jan. 16, 2014, each of which are hereby incorporated by reference in their entirety.

FIELD

The present invention relates to three-dimensionally printed articles and a method of printing a three-dimensional article.

INTRODUCTION

Commercially available three-dimensional printers (3D), such as the Projet™ 3D Printers manufactured by 3D Systems of Rock Hill, S.C., use a build material or ink that is jetted through a print head as a liquid to form various thermopolymer parts. Other printing systems are also used to build 3D parts from material that is jetted through a printer head. In some instances, the build material is solid at ambient temperatures and converts to liquid at elevated jetting temperatures. In other instances, the build material is liquid at ambient temperatures. Well-known build materials are poly(acrylonitrile-butadiene-styrene) (ABS) and polylactic acid (PLA).

Moreover, production of a three-dimensional part in a 3D printing system often requires the use of a support material in conjunction with the build material. E.g., the support material supports overhanging segments or portions which are not directly supported in the final geometry by the build material. The support material can be used for several other purposes, e.g., to minimize warping from the build material's own load, to produce hollow sections, and/or to enable several moving components in the same part. The support material is also jetted through a printing nozzle as a liquid or extruded as a softened material and typically consists of chemical species that are solid at ambient temperatures and fluid at elevated jetting temperatures. However, unlike the build material, the support material is subsequently removed after printing to provide the finished three-dimensional part. The support material should be removed without damaging the printed build material.

Removal of the support material can be administered through several processes, including heating the support material to a temperature above its melting point in conjunction with the use of a suitable organic carrier to sufficiently remove the support material from the build material. In some cases, the organic carrier deposits an undesirable oily residue on the completed three-dimensional part. Furthermore, the use of elevated temperatures, in addition to a suitable organic carrier, in some situations can compromise the mechanical integrity of the finished three-dimensional part resulting in part deformation or failure.

To solve this problem, U.S. Pat. No. 5,503,785 suggests depositing a release material as a thin coating between the build material and the support material. The release material is a hydrocarbon wax or a water-soluble wax, acrylates, polyethylene oxide, glycol-based polymers, polyvinyl pyrrolidone-based polymers, methyl vinyl ethers, maleic acid-based polymers, polyoxazolidone-based polymers, Polyquarternium II or conventional mold release materials, such as fluorochemicals, silicones paraffins or polyethylenes. Depending on the type of release layer, it may also leave an undesirable oily residue on the completed three-dimensional part. Moreover, the release layer adds complexity to the three-dimensional printing of the articles.

A well-known support material is High Impact Polystyrene (HIPS). After the 3D printing HIPS can be dissolved in limonene to remove HIPS from the printed build material. Unfortunately, limonene has a low flash point and leaves undesirable wastes.

Another known support material is polylactic acid (PLA). It can be dissolved in a heated sodium hydroxide solution. Unfortunately, PLA leaves undesirable wastes.

U.S. Pat. No. 6,070,107 discloses the use of poly(2-ethyl-2-oxazolidone) as water-soluble rapid prototyping support and mold material. Unfortunately, poly(2-ethyl-2-oxazolidone) is very tacky. Moreover, on thermal decomposition of poly(2-ethyl-2-oxazolidone) fumes are generated, specifically nitrogen oxides and carbon oxide, as disclosed in its Material Safety Data Sheet.

It is well known to use polyvinyl alcohol (PVA) as a support material for ABS. PVA and ABS can be printed simultaneously. After the 3D printing has been completed, the printed article can be submerged in water. The PVA is dissolved in warm water and leaves the ABS portion of the printed article intact. Unfortunately, PVA is quite difficult to print and does not sufficiently adhere to ABS. However, some adherence of the support material to the build material is very desirable to provide a good support and minimize warping of the build material.

In view of the deficiencies of the known support materials in three-dimensional printing, one object of the present invention is to provide another support material for three-dimensionally printed articles.

A preferred object of the present invention is to provide a support material that is easily removable from the build material after three-dimensional printing of the support material and the build material. Another preferred object of the present invention is to provide a support material that does not leave substantially toxic or corrosive waste upon removal of the support material. Yet another preferred object of the present invention is to provide a support material that has a reasonably good adhesion to the build material. To facilitate handling, yet another preferred object of the present invention is to provide a support material that has a low level of surface tackiness.

SUMMARY

Surprisingly, it has been found that certain hydroxypropyl methylcelluloses are very advantageous in three-dimensional printing.

Accordingly, one aspect of the present invention is a three-dimensionally printed article which comprises a build material and a support material, the support material comprising a hydroxypropyl methylcellulose having a DS of at least 1.0 and an MS of at least 0.6, wherein DS is the degree of substitution of methoxyl groups and MS is the molar substitution of hydroxypropoxyl groups.

Another aspect of the present invention is a method of printing a three-dimensional article which comprises selectively depositing layers of a fluid build material to form the three-dimensional article on a substrate; and supporting at least one of the layers of the build material with a support material, the support material comprising the above-mentioned hydroxypropyl methylcellulose.

Yet another aspect of the present invention is the use of the above-mentioned hydroxypropyl methylcellulose in three-dimensional printing.

DESCRIPTION OF EMBODIMENTS

Figure 1A:
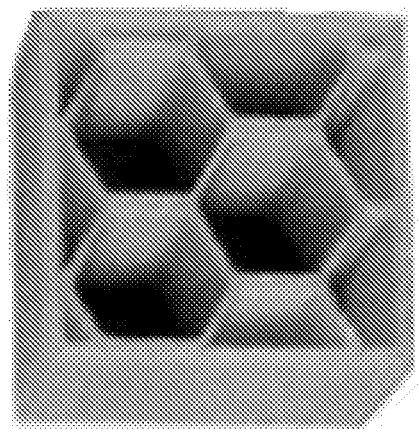
FIG. 1A illustrates a three-dimensionally printed article that has been printed from one type of the hydroxypropyl methylcellulose support material.

The three-dimensionally printed article of the present invention comprises a build material and a support material. An essential component of the support material is the hydroxypropyl methylcellulose described below. Surprisingly, this hydroxypropyl methylcellulose can be subjected to three-dimensional printing techniques and can be utilized as or in a support material to support the build material of a three-dimensionally printed article. The hydroxypropyl methylcellulose can be removed from the build material of the three-dimensionally printed article with the aid of water and leaves a non-toxic, non-corrosive and bio-degradable residue in the water.

The hydroxypropyl methylcellulose has a cellulose backbone having β-1,4 glycosidically bound D-glucopyranose repeating units, designated as anhydroglucose units in the context of this invention. The degree of the substitution of hydroxyl groups of the anhydroglucose units by methoxyl groups and hydroxypropoxyl groups is essential in the present invention. The hydroxyl groups of the anhydroglucose units are not substituted by any groups other than methoxyl and hydroxypropoxyl groups.

The average number of methoxyl groups per anhydroglucose unit is designated as the degree of substitution of methoxyl groups, DS. In the definition of DS, the term "hydroxyl groups substituted by methoxyl groups" is to be construed within the present invention to include not only methylated hydroxyl groups directly bound to the carbon atoms of the cellulose backbone, but also methylated hydroxyl groups of hydroxypropoxyl substituents bound to the cellulose backbone.

The degree of the substitution of hydroxyl groups of the anhydroglucose units by hydroxypropoxyl groups is expressed by the molar substitution of hydroxypropoxyl groups, the MS. The MS is the average number of moles of hydroxypropoxyl groups per anhydroglucose unit in the hydroxypropyl methylcellulose. It is to be understood that during the hydroxypropoxylation reaction the hydroxyl group of a hydroxypropoxyl group bound to the cellulose backbone can be further etherified by a methylation agent and/or a hydroxypropoxylation agent. Multiple subsequent hydroxypropoxylation reactions with respect to the same carbon atom position of an anhydroglucose unit yields a side chain, wherein multiple hydroxypropoxyl groups are covalently bound to each other by ether bonds, each side chain as a whole forming a hydroxypropoxyl substituent to the cellulose backbone. The term "hydroxypropoxyl groups" thus has to be interpreted in the context of the MS as referring to the hydroxypropoxyl groups as the constituting units of hydroxypropoxyl substituents, which either comprise a single hydroxypropoxyl group or a side chain as outlined above, wherein two or more hydroxypropoxyl units are covalently bound to each other by ether bonding. Within this definition it is not important whether the terminal hydroxyl group of a hydroxypropoxyl substituent is further methylated or not; both methylated and non-methylated hydroxypropoxyl substituents are included for the determination of MS.

The hydroxypropyl methylcellulose utilized in the composition of the present invention has a DS of at least 1.0, preferably at least 1.4, more preferably at least 1.5, even more preferably at least 1.6, and most preferably at least 1.7. The hydroxypropyl methylcellulose generally has a DS of up to 2.7, more typically up to 2.5, and even more typically up to 2.4, and most typically up to 2.1.

The hydroxypropyl methylcellulose utilized in the composition of the present invention has an MS of at least 0.6, preferably at least 0.7, and more preferably at least 0.8. The hydroxypropyl methylcellulose generally has an MS of up to 1.9, typically up to 1.7, more typically up to 1.5, even more typically up to 1.3, and most typically up to 1.1.

The determination of the % methoxyl and % hydroxypropoxyl is carried out according to the United States Pharmacopeia (USP 35, "Hypromellose", pages 3467-3469). The values obtained are % methoxyl and % hydroxypropoxyl. These are subsequently converted into degree of substitution (DS) for methoxyl substituents and molar substitution (MS) for hydroxypropoxyl substituents. Residual amounts of salt are taken into account in the conversion.

The hydroxypropyl methylcellulose utilized in the composition of the present invention preferably has a viscosity of up to 100 mPa·s, more preferably up to 60 mPa·s, even more preferably up to 40 mPa·s, and most preferably up to 30 mPa·s, or up to 20 mPa·s, or up to 10 mPa·s, determined as a 2% by weight solution in water at 20° C. in a Haake VT550 Viscotester at a shear rate of 2.55 s$^{-1}$. The viscosity is preferably at least 1.2 mPa·s, and more preferably at least 2.4 mPa·s or at least 3 mPa·s. Hydroxypropyl methylcelluloses of such viscosity can be obtained by subjecting a hydroxypropyl methylcellulose of higher viscosity to a partial depolymerization process. Partial depolymerization processes are well known in the art and described, for example, in European Patent Applications EP 1,141,029; EP 210,917; EP 1,423,433; and U.S. Pat. No. 4,316,982.

The hydroxypropyl methylcelluloses utilized in the present invention and their use as thickening agents for organic liquids are described in U.S. Pat. No. 4,614,545, but their utility in three-dimensional printing has been unknown before the present invention. The composition of the present invention can comprise one or more of the above-described hydroxypropyl methylcelluloses.

The support material preferably does not comprise more than 5 weight percent, more preferably not more than 3 weight percent, and most preferably not more than 1 weight percent of water, based on the total weight of the support material. Moreover, the support material preferably does not comprise more than 5 weight percent, more preferably not more than 3 weight percent, and even more preferably not more than 1 weight percent of an organic solvent having a boiling point of up to 230° C. at atmospheric pressure, based on the total weight of the support material. Most preferably the support material does not comprise water or an organic solvent having a boiling point of up to 230° C. at atmospheric pressure.

The support material may further comprise additives, different from the above-mentioned hydroxypropyl methylcellulose, such as rheological modifiers, stabilizers, fillers, plasticizers, pigments and/or impact modifiers. However, an advantage of the present invention is that the presence of such additives different from the above-mentioned hydroxypropyl methylcellulose is optional. The support material does not require the content of a substantial amount or any amount of such additives. More specifically, the support material does not require the presence of a substantial amount or any amount of waxes, oils or lubricants which might leave an oily or waxy surface of the build material after removal of the support material.

Non-limiting examples of fillers are carhohydrates, sugars, sugar alcohols, proteins, or NaCl. Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.1 to 3 percent, based on the weight of the hydroxypropyl methylcellulose. Non-limiting examples of lubricants are for example polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants is from 0.1 to 10 percent, more typically from 0.3 to 6 percent, based on the weight of the hydroxypropyl methylcellulose.

Uniform mixing of the hydroxypropyl methylcellulose with one or more optional additives, e.g., selected from surfactants, lubricants, stabilizers and antioxidants to produce the support material can be accomplished by, for example, a known conventional kneading process.

The above-described hydroxypropyl methylcellulose generally amounts to at least 50 wt %, preferably at least 60 wt %, more preferably at least 70 wt %, and even more preferably at least 90 wt %, based on the total weight of the support material. The amount of the hydroxypropyl methylcellulose is up to 100 wt %, and preferably up to 95 wt %, based on the total weight of the support material.

One aspect of the present invention is the use of a hydroxypropyl methylcellulose disclosed further above in three-dimensional printing, preferably the use of the hydroxypropyl methylcellulose as a support material for at least one layer of a build material.

Known build materials are e.g., thermoplastic polymers, such as polyoxymethylene, polylactic acid, ethylene vinyl acetate copolymers, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides polyurethanes, polyethylenes, polypropylenes, and combinations, thereof. Preferred build materials are those known for fused deposition modeling (FDM) techniques, such as a poly(acrylonitrile-butadiene-styrene), a polycarbonate, or polylactic acid.

Another aspect of the present invention is a method of printing a three-dimensional article which comprises: selectively depositing layers of a fluid build material to form the three-dimensional article on a substrate; and supporting at least one of the layers of the build material with a support material, the support material comprising the above-described hydroxypropyl methylcellulose and optional additives as described above. Suitable substrates on which the three-dimensional article is formed are known in the art, such as plates or sheets made of glass, metal or synthetic materials.

The method of the present invention is preferably carried out according to fused deposition modeling (FDM) or according to selective deposition modeling (SDM), wherein two different polymers are melted in nozzles and selectively printed, one being a build material and the other one being the support material. The build material and the support material can be heated to the same or different temperatures to bring them into a molten or softened shape. The support material that comprises, substantially consists of or even consists of the above-mentioned hydroxypropyl methylcellulose is typically heated to a temperature of at least 100° C., preferably at least 110° C. The temperature should generally not be above the temperature where the hydroxypropyl methylcellulose begins to degrade. Generally the support material is heated to a temperature of up to 230° C., preferably up to 220° C., and more preferably up to 200° C. Typically the build material is also heated to a temperature of at least 100° C., or at least 110° C., and up to 230° C., or up to 220° C., or up to 200° C. The FDM process is described in U.S. Pat. No. 5,121,329, the teaching of which is incorporated herein by reference. Typically the build material and/or support material, is selectively deposited according to an image of the three-dimensional article, the image being in a computer readable format. For example, the build material can be deposited according to preselected computer aided design (CAD) parameters. In some embodiments of the invention the fluid build material solidifies upon deposition. In other embodiments the build material, comprises a curable material, such as a or more photocurable chemical species.

In the method of the present invention the support material comprises, substantially consists of, or consists of the above-described hydroxypropyl methylcellulose. At least one of the layers of the build material is supported with the support material. The support material is only temporarily needed. Upon hardening of the build material, e.g., by cooling, the support material is removed. For example, the hydroxypropyl methylcellulose is removed in a washing step wherein the hydroxypropyl methylcellulose dissolves in water, preferably in water of ambient temperature, leaving the build material behind that forms the actual desired three-dimensional object. For example, the entire three-dimensionally printed article comprising the build material and the support material is placed in a water bath or is contacted with running water so that the water dissolves the hydroxypropyl methylcellulose and leaves the desired three-dimensional object produced from the build material behind.

It is a great advantage of the present invention that the hydroxypropyl methylcellulose utilized as support material or as an essential component of the support material can be removed from the build material by simply contacting the support material with water. The hydroxypropyl methylcellulose leaves non-toxic wastes. Moreover, at least in the preferred embodiments of the invention, the hydroxypropyl methylcellulose can be removed faster than support materials known in the prior art.

Some embodiments of the invention will now be described in detail in the following Examples.

EXAMPLES

Unless otherwise mentioned, all parts and percentages are by weight. In the Examples the following test procedures are used.

Examples 1 and 2

Preparation of Filaments for Three-Dimensional (3-D) Printing

Filaments for three-dimensional printing are produced from two different hydroxypropyl methylcellulose (HPMC) powder samples having a DS (methyl), a MS(hydroxypropoxyl) and a viscosity as listed in Table 1 below. The HPMC samples are prepared using a known method for etherification of alkalized cellulose. The etherification agents methyl chloride and propylene oxide are added to alkali cellulose and reacted at elevated temperatures. The resulting crude HPMC is neutralized, washed free of chloride using hot water, dried and ground. The produced HPMC is subjected to partial depolymerization by heating the HPMC powder with gaseous hydrogen chloride at a temperature of 60-85° C. for 80-100 min.

The determination of the % methoxyl and % hydroxypropoxyl is carried out according to the United States Pharmacopeia (USP 35, "Hypromellose", pages 3467-3469). These are subsequently converted into degree of substitution (DS) for methoxyl substituents and molar substitution (MS) for hydroxypropoxyl substituents. The viscosity of the HPMC samples is determined as a 2% by weight solution in water at 20° C. in a Haake VT550 Viscotester at a shear rate of 2.55 s$^{-1}$.

TABLE 1

| HPMC | DS (methyl) | MS(hydroxypropoxyl) | 2% Viscosity in water at 20° C. (mPa · s) |
|---|---|---|---|
| HPMC-1 | 2.2 | 1.2 | 40 |
| HPMC-2 | 1.9 | 0.9 | 5 |

A capillary rheometer (Malvern RH10, Malvern Instruments) equipped with a die which is suitable to produce HPMC filaments of 1.8 mm is heated up to 175° C. in the case of HPMC-1 or 145° C. in the case of HPMC-2 and filled with the HPMC powder. The vertical extrusion through the die is performed with a piston driving at about 5 mm/min. The resulting spaghetti-like filaments of 1.8 mm diameter are hardened by cooling to room temperature. They are subsequently used for the 3-D-printing step without any further treatment.

3-D Printing of HPMC Filaments

A 3D Printer MakerBot Replicator 2X, which is commercially available from Stratasys Ltd, Minneapolis, Minn. (USA), is used for 3-D printing.

FIG. 1A illustrates an article that has been three-dimensionally printed at 200° C. from the HPMC-1 filaments of 1.8 mm.

Figure 1B:
FIG. 1B illustrates a three-dimensionally printed article that has been printed from another type of the hydroxypropyl methylcellulose support material.

FIG. 1B illustrates an article that has been three-dimensionally printed at 210° C. from the HPMC-2 filaments of 1.8 mm.

Printing trials are repeated several times with HPMC-1 and HPMC-2 wherein the 3D Printer is heated to different temperatures in the range of 180 to 230° C. All HPMC samples display good 3-D printability. The HPMC filaments can be easily loaded into the printer nozzle. All HPMC samples display good bonding between the individual layers of the HPMC material.

Solubility in Water

Filaments having a diameter of 1.8 mm are produced from HPMC-1 and HPMC-2 in the capillary rheometer as described above.

For comparative purposes a polyvinyl alcohol (PVA) filament having a diameter of 1.8 mm is evaluated. The polyvinyl alcohol filament is commercially available from Stratasys Ltd, Minneapolis, Minn. (USA). Polyvinyl alcohol is a known support material for three-dimensional printing which is considered as the material which is easiest and fastest to remove after three-dimensional printing.

Samples of the filaments produced from PVA, HPMC-1 and HPMC-2, all having a diameter of 1.8 mm, the same length and a temperature of 20° C., are placed into jars, each equipped with a shaker and containing water of a temperature of 20° C. The filaments are placed on the shaker that has been placed into the water. The dissolution of the filaments is monitored as the function of time. Weight measurements of the remaining filaments are carried out and listed in Table 2 below as percentage of the original weight. A weight over 100% is due to water uptake by the filaments when they swell in water.

TABLE 2

| Wt % of filament, based on weight at time = 0 min. | HPMC-1 | HPMC-2 | PVA (Comp.) |
|---|---|---|---|
| at 0 min | 100.0% | 100.0% | 100.0% |
| at 10 min | 100.0% | 72.5% | 102.0% |
| at 20 min | 100.0% | 28.7% | 102.4% |
| at 25 min | 100.0% | 6.7% | 101.7% |
| at 30 min | 100.0% | 0.9% | 110.2% |
| at 35 min | 100.0% | 0.0% | 101.1% |
| at 60 min | 101.9% | — | 101.0% |
| at 120 min | 103.5% | — | 101.1% |

As it can be seen from the results in Table 2, HPMC-1 and PVA show similar behavior with some swelling and weight gain. This swelling and softening occurs faster in PVA than in HPMC-1. The results in Table 2 illustrate that a hydroxypropyl methylcellulose having a DS of at least 1.0 and an MS of at least 0.6 is as useful as a support material for three-dimensional printing as polyvinyl alcohol (PVA) which is widely used for this purpose.

The weight of HPMC-2 reduces very quickly from the beginning. The thickness of the filament produced from HPMC-2 is visibly reduced; in 35 minutes of soaking in water the filament has completely disappeared. Since cleaning operation after 3-D printing often takes longer than printing itself, HPMC-2, which represents a preferred embodiment of the invention, shows a great advantage. Not only it is non-toxic and can be removed by washing just in water, but it can also be removed in much shorter time than PVA.

Examples 3-9 and Comparative Examples A-C

Extrusion Trials

Samples of HPMCs are provided which have a DS (methyl), a MS (hydroxypropoxyl) and a viscosity as listed in Table 3 below. The samples are prepared as described for Examples 1 and 2 above.

A 30 ml kneading cell W30 of a Brabender Plasti-Corder PL 2000 torque kneader with a metallic cover is heated to a temperature above the softening temperature of the HPMC, as listed in Table 3 below. After automatic calibration of the empty cell, HPMC powder is filled into the cell. Homogenization is carried out at 30 rpm until a constant torque is reached.

A capillary rheometer (Malvern RII10, Malvern Instruments) having a die of 1.7 mm diameter and 27.2 mm length is heated to the temperature listed in Table 3 below and filled with a paste coming out of the torque kneader. Vertical extrusion through the die is performed with a piston moving at about 5 mm/min. The resulting spaghetti-like filaments are evaluated by visual inspection.

As illustrated by the results in Table 3, HPMCs which do not have an MS of at least 0.6 do not have sufficient thermoplasticity to be useful in three-dimensional printing.

TABLE 3

| | HPMC properties | | | Extrusion | | | |
|---|---|---|---|---|---|---|---|
| HPMC | DS | MS | 2% viscosity (mPa · s) | softening Temp. (° C.) ($^1$) | Kneading Temp. (° C.) ($^2$) | Result ($^3$) | Extrusion temp. (° C.)/pressure (MPa) |
| HPMC-3 | 2.00 | 0.76 | 7 | 109 | 118 | Plastic | 123° C./9 MPa |
| HPMC-4 | 2.05 | 0.80 | 14 | 100 | 102 | Plastic | 170° C./11 MPa |
| HPMC-5 | 2.02 | 0.83 | 6 | 100 | 148 | Plastic | 120° C./1 MPa |
| HPMC-6 | 1.97 | 0.80 | 6 | 98 | 101-110 | Plastic | 120° C./3 MPa |
| HPMC-7 | 1.90 | 0.93 | 6 | 132 | 157-167 | Plastic | 165° C./n.d. |
| HPMC-8 | 1.91 | 1.04 | 7 | 137 | 156 | Plastic | 165° C./13 MPa |
| HPMC-9 | 1.84 | 1.17 | 5 | 133 | 148 | Plastic | 170° C./11 MPa |
| HPMC-A (Comp.) | 1.49 | 0.15 | 180 | >240 | Not possible | — ($^4$) | Not possible |
| HPMC-B (Comp.) | 1.81 | 0.18 | 50 | >240 | Not possible | — ($^4$) | Not possible |
| HPMC-C (Comp.) | 1.92 | 0.44 | 4300 | >240 | Not possible | — ($^4$) | Not possible |

($^1$) softening temperature, determined with a hot stage microscope, heating rate: 2° C./min.
($^2$) real temperature in the kneading cell before kneading start
($^3$) paste properties in the kneader after visual inspection
n.d.: not determined
($^4$) Particles do not melt, no plastic mass Example 10

Three-Dimensionally Printed ABS Article

A three-dimensional article is produced from a HPMC-1 filament of 1.8 mm as the support material and a poly (acrylonitrile-butadiene-styrene) (ABS) filament of 1.8 mm diameter as the build material. The ABS filament are commercially available from Stratasys Ltd, Minneapolis, Minn. (USA).

A 3D Printer MakerBot Replicator 2X, which is commercially available from Stratasys Ltd, Minneapolis, Minn. (USA), is used for 3-D printing. HPMC-1 and ABS are printed from two printing nozzles at 230° C.

Figure 2:
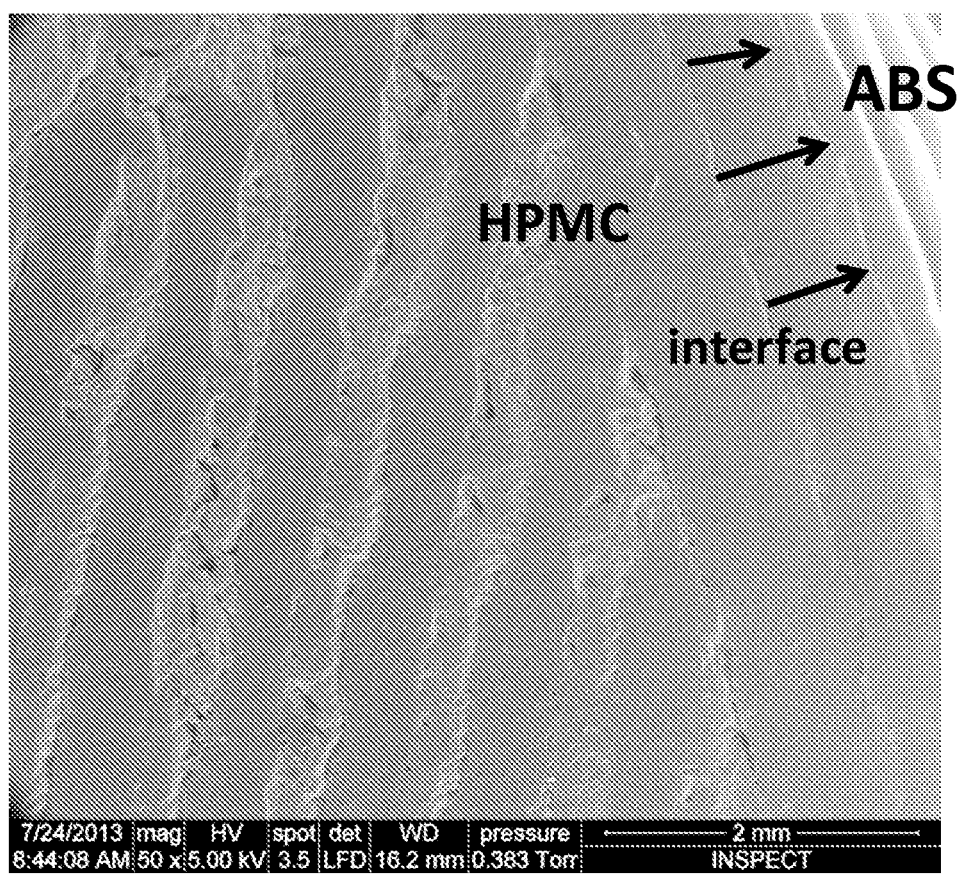
FIG. 2 represents a picture, obtained by Scanning Electron Microscopy, of a portion of a three-dimensionally printed article at the interface of a hydroxypropyl methylcellulose support material and a poly(acrylonitrile-butadiene-styrene) build material.
Figure 3:
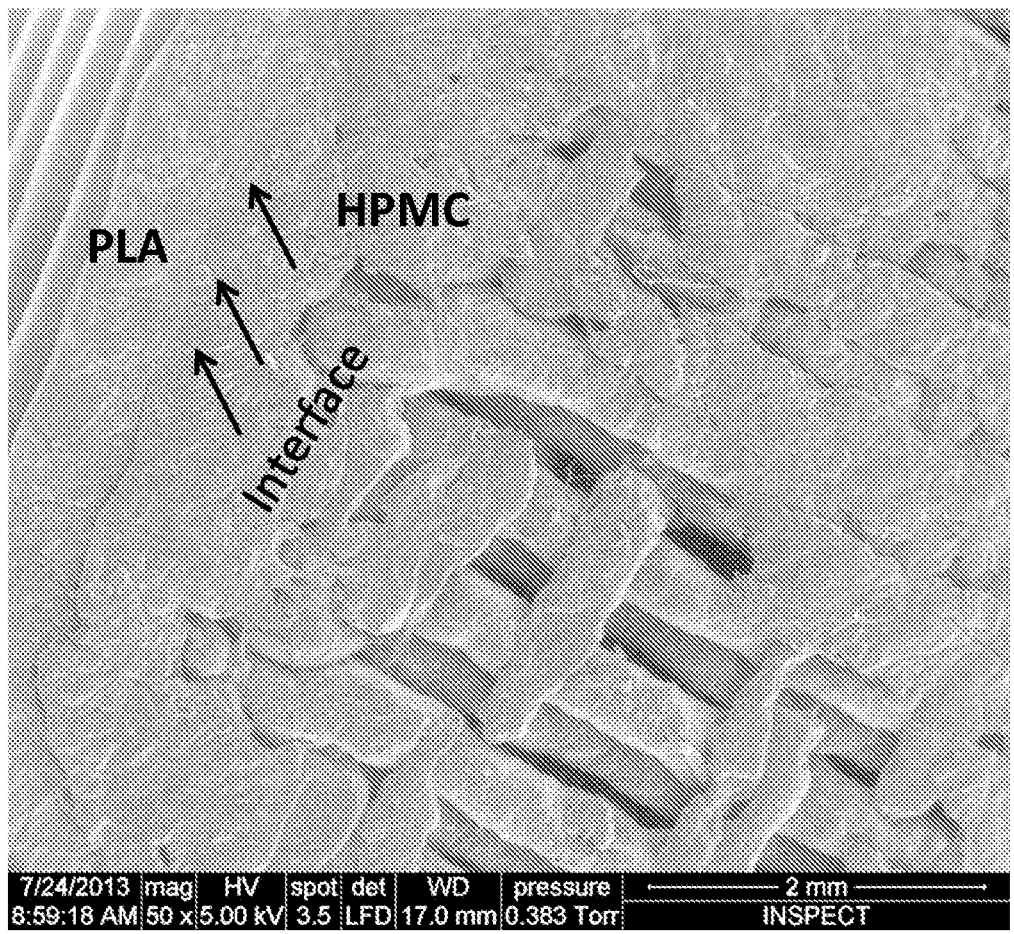
FIG. 3 represents a picture, obtained by Scanning Electron Microscopy, of a portion of a three-dimensionally printed article at the interface of a hydroxypropyl methylcellulose support material and a polylactic acid build material.

FIG. 2 represents a picture, obtained by Scanning Electron Microscopy (SEM), of a portion of the three-dimensionally printed article at the interface of the HPMC-1 support material and the ABS build material. The SEM picture shows no delamination at the interface, which is an indication of a good adhesion between the printed HPMC-1 support material and the ABS build material.

Example 11

Three-Dimensionally Printed ABS Article

Example 10 is repeated, except that a HPMC-2 filament of 1.8 mm is used as the support material. A good adhesion between the printed HPMC-2 support material and the ABS build material is achieved.

Example 12

Three-Dimensionally Printed PLA Article

Example 10 is repeated, except that polylactic acid (PLA) is used as a build material. The PLA filaments of 1.8 mm diameter are commercially available from Stratasys Ltd, Minneapolis, Minn. (USA). The same 3D Printer as in Example 10 is used for 3-D printing. HPMC-1 and PLA are printed from 2 printing nozzles at 215° C. Inspection of the interfaces shows no delamination, indicating good interfacial bonding.

Printing at lower temperature (180° C.) results in weaker adhesion between PLA and HPMC-1 and delamines easier after cooling.

Example 13

Three-Dimensionally Printed PLA Article

Example 12 is repeated, except that a HPMC-2 filament of 1.8 mm is used as the support material. Essentially the same results are obtained as in Example 12.

The invention claimed is:
1. A method of printing a three-dimensional article comprising:
   selectively depositing layers of a fluid build material to form the three-dimensional article on a substrate; and
   supporting at least one of the layers of the build material with a support material, the support material compris- ing a hydroxypropyl methylcellulose having a DS of at least 1.0 and an MS of at least 0.6, wherein DS is the degree of substitution of methoxyl groups and MS is the molar substitution of hydroxypropoxyl groups, and at most 5 weight percent of water.

2. The method of claim 1, wherein the layers of the build material are deposited according to an image of the three-dimensional article in a computer readable format.

3. The method of claim 2 further comprising hardening the build material.

4. The method of claim 3 further comprising removing the support material from the build material by contacting the support material with water.

5. The method of claim 1 wherein the amount of the hydroxypropyl methylcellulose is at least 50 weight percent of the total weight of the support material.

6. The method of claim 1 wherein the hydroxypropyl methylcellulose has a DS of at least 1.4.

7. The method of claim 1 wherein the hydroxypropyl methylcellulose has a DS of from 1.6 to 2.5.

8. The method of claim 1 wherein the hydroxypropyl methylcellulose has an MS of from 0.6 to 1.7.

9. The method of claim 1 wherein the build material comprises a thermoplastic material selected from the group consisting of poly(acrylonitrile-butadiene-styrene), polycarbonate, polylactic acid and polyethylene terephthalate.

10. The method of claim 1 wherein the hydroxypropyl methylcellulose has a viscosity that is up to 30 mPa·s, determined as a 2% by weight solution in water at 20° C.

11. The method of claim 1 wherein both the build material and the support material are melted in nozzle and selectively printed.

12. The method of claim 11 wherein the hydroxypropyl methylcellulose has an MS of from 0.7 to 1.3.

13. The method of claim 1 wherein the support material has at most 3 weight percent of water.

14. The method of claim 1 wherein the support material has at most 1 weight percent of water.

* * * * *